(12) United States Patent
Griggs, Jr.

(10) Patent No.: US 9,265,347 B2
(45) Date of Patent: Feb. 23, 2016

(54) CAM ASSEMBLY UTILIZING 2 OR MORE INTERCONNECTED AND LOCKING PARTS FOR FURNITURE

(71) Applicant: Billy Joe Griggs, Jr., Pulaski, TN (US)

(72) Inventor: Billy Joe Griggs, Jr., Pulaski, TN (US)

( * ) Notice: Subject to any disclaimer, the term of this patent is extended or adjusted under 35 U.S.C. 154(b) by 0 days.

(21) Appl. No.: 14/167,249

(22) Filed: Jan. 29, 2014

(65) Prior Publication Data

US 2014/0239698 A1  Aug. 28, 2014

Related U.S. Application Data

(60) Provisional application No. 61/758,231, filed on Jan. 29, 2013.

(51) Int. Cl.
*A47C 3/02* (2006.01)
*A47C 1/02* (2006.01)
*A47C 3/027* (2006.01)

(52) U.S. Cl.
CPC . *A47C 1/02* (2013.01); *A47C 3/027* (2013.01); *Y10T 29/49826* (2015.01)

(58) Field of Classification Search
USPC ............... 403/326, 325, 328, 329; 297/440.1, 297/440.21, 259.1, 259.2
See application file for complete search history.

(56) References Cited

U.S. PATENT DOCUMENTS

| | | | | |
|---|---|---|---|---|
| 2,271,496 | A | | 4/1940 | Hofman |
| 3,279,847 | A | * | 10/1966 | Re .................................... 297/89 |
| 3,525,549 | A | * | 8/1970 | Knabusch et al. ........ 297/440.21 |
| 3,934,930 | A | * | 1/1976 | Sandham ...................... 297/291 |
| 3,989,298 | A | * | 11/1976 | Cycowicz et al. ............. 297/342 |
| 4,890,888 | A | * | 1/1990 | Kostin ..................... 297/440.21 |
| 4,900,090 | A | * | 2/1990 | Davis ......................... 297/440.1 |
| 5,184,871 | A | * | 2/1993 | LaPointe et al. ......... 297/440.21 |
| 5,253,923 | A | | 10/1993 | Gootee |
| 5,269,589 | A | * | 12/1993 | Brothers et al. ......... 297/440.16 |
| 5,288,126 | A | * | 2/1994 | Saul et al. ..................... 297/85 R |
| 5,520,441 | A | * | 5/1996 | Citton ...................... 297/440.21 |
| 5,658,049 | A | * | 8/1997 | Adams et al. ............ 297/440.23 |
| 6,315,360 | B1 | | 11/2001 | Guerrini |
| 6,557,942 | B1 | * | 5/2003 | Shieh ....................... 297/440.15 |
| 6,698,840 | B1 | * | 3/2004 | Tseng ...................... 297/440.15 |
| 6,752,464 | B1 | * | 6/2004 | Tseng ...................... 297/440.16 |
| 6,918,632 | B2 | * | 7/2005 | Maki et al. .................. 297/258.1 |
| 7,328,949 | B2 | * | 2/2008 | Donovan et al. ........... 297/259.2 |
| 7,628,452 | B2 | * | 12/2009 | Du et al. .................... 297/259.2 |
| 7,832,806 | B2 | * | 11/2010 | Yamada ................... 297/440.15 |
| 7,896,437 | B2 | * | 3/2011 | Donovan ................... 297/265.1 |
| 7,909,407 | B2 | * | 3/2011 | Dudash et al. ........... 297/440.15 |
| 2006/0232113 | A1 | * | 10/2006 | Hale et al. .................. 297/258.1 |

* cited by examiner

*Primary Examiner* — Daniel Wiley
(74) *Attorney, Agent, or Firm* — Wayne Edward Ramage; Baker Donelson

(57) ABSTRACT

A mechanism and method for assembling a base to a piece of furniture is provided with at least two cams having complimentary interlock mechanisms constructed and arranged to interlock one to another.

13 Claims, 5 Drawing Sheets

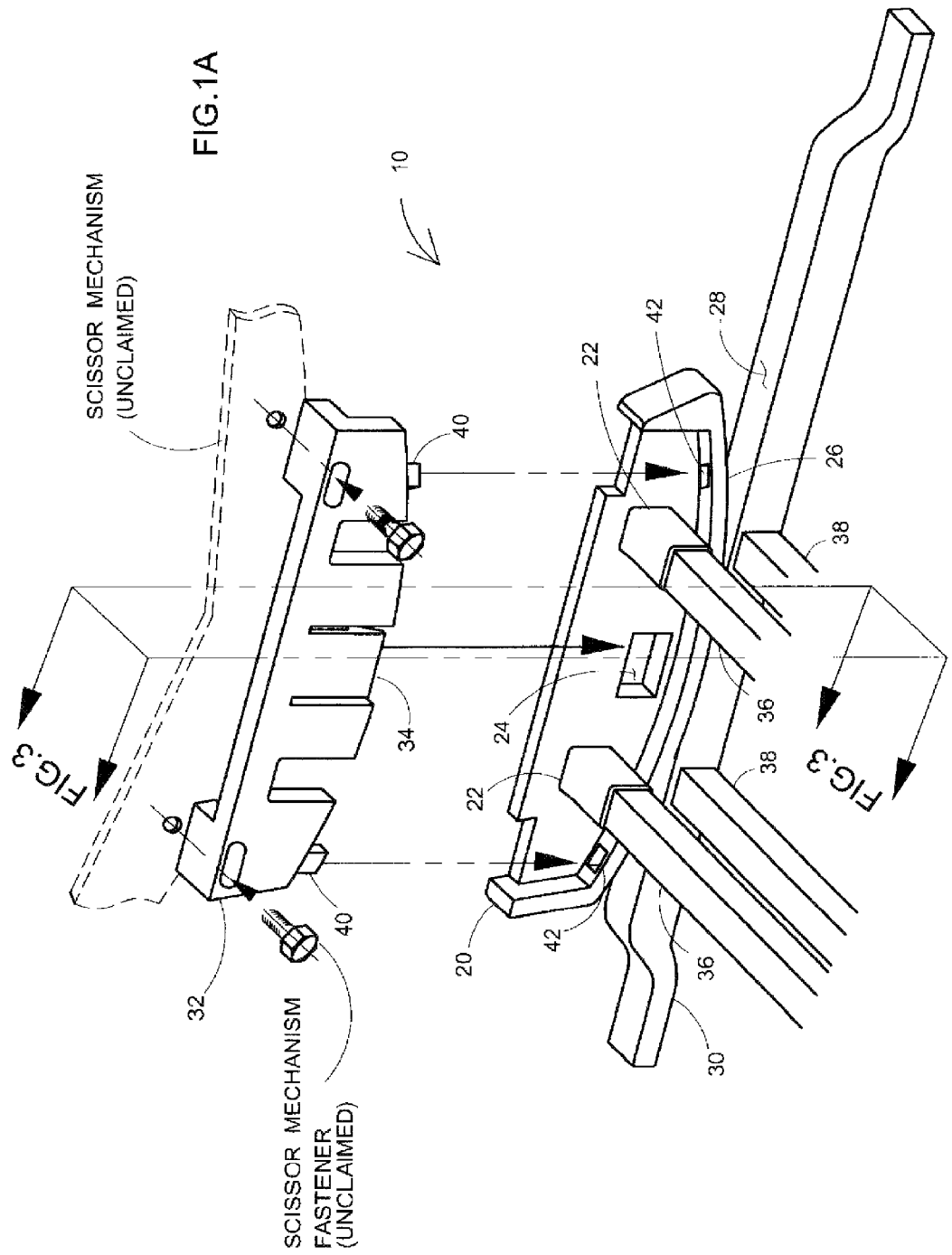

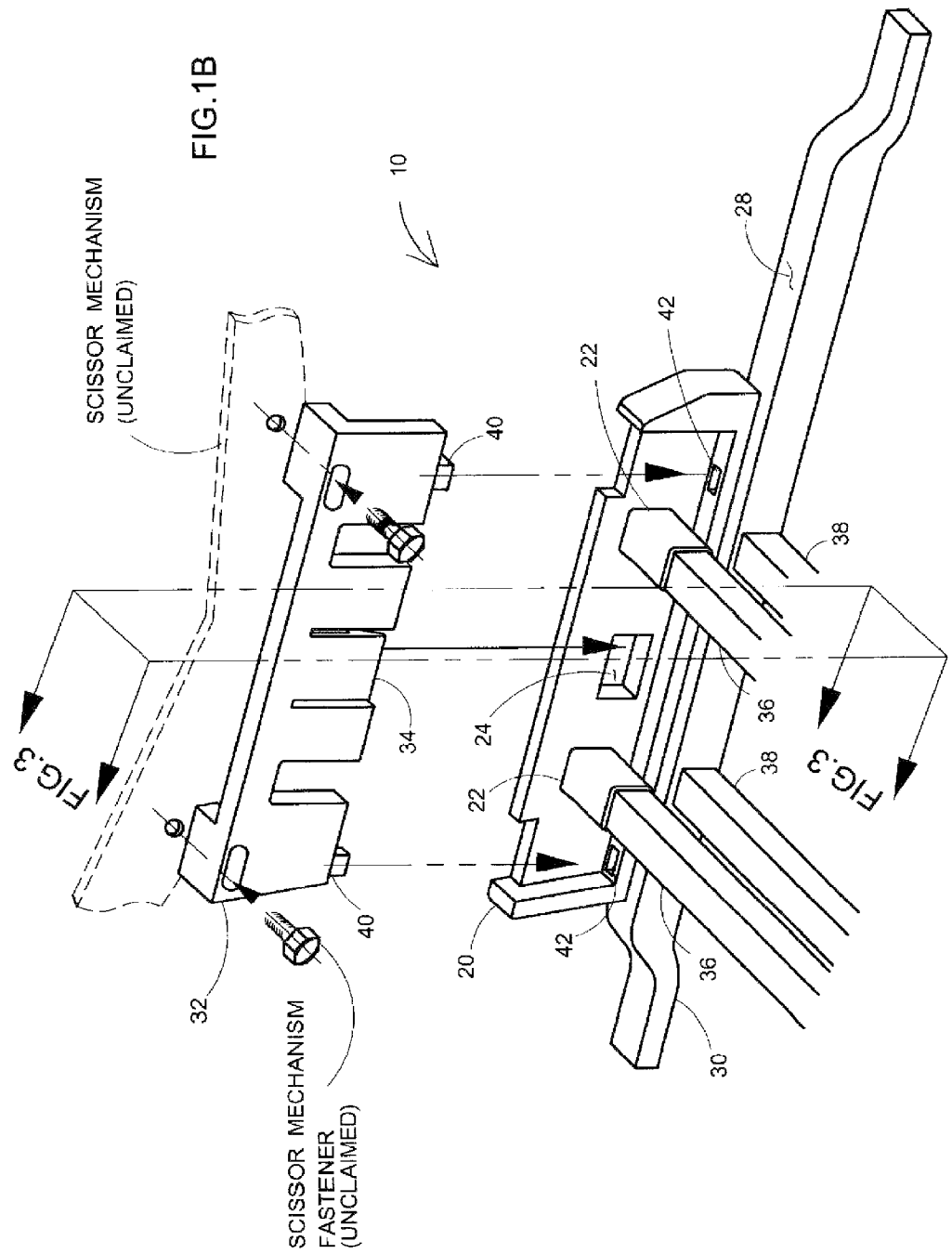

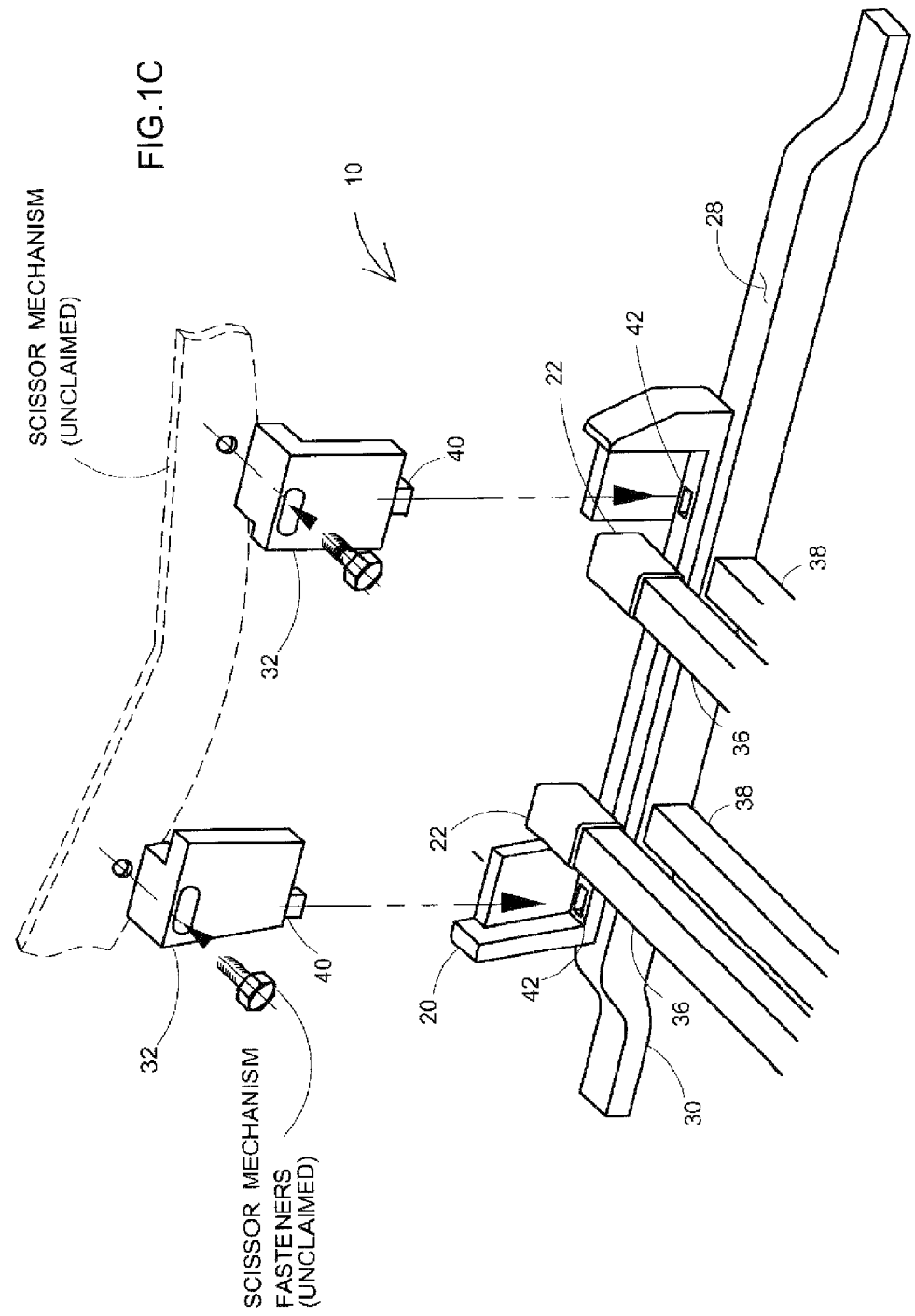

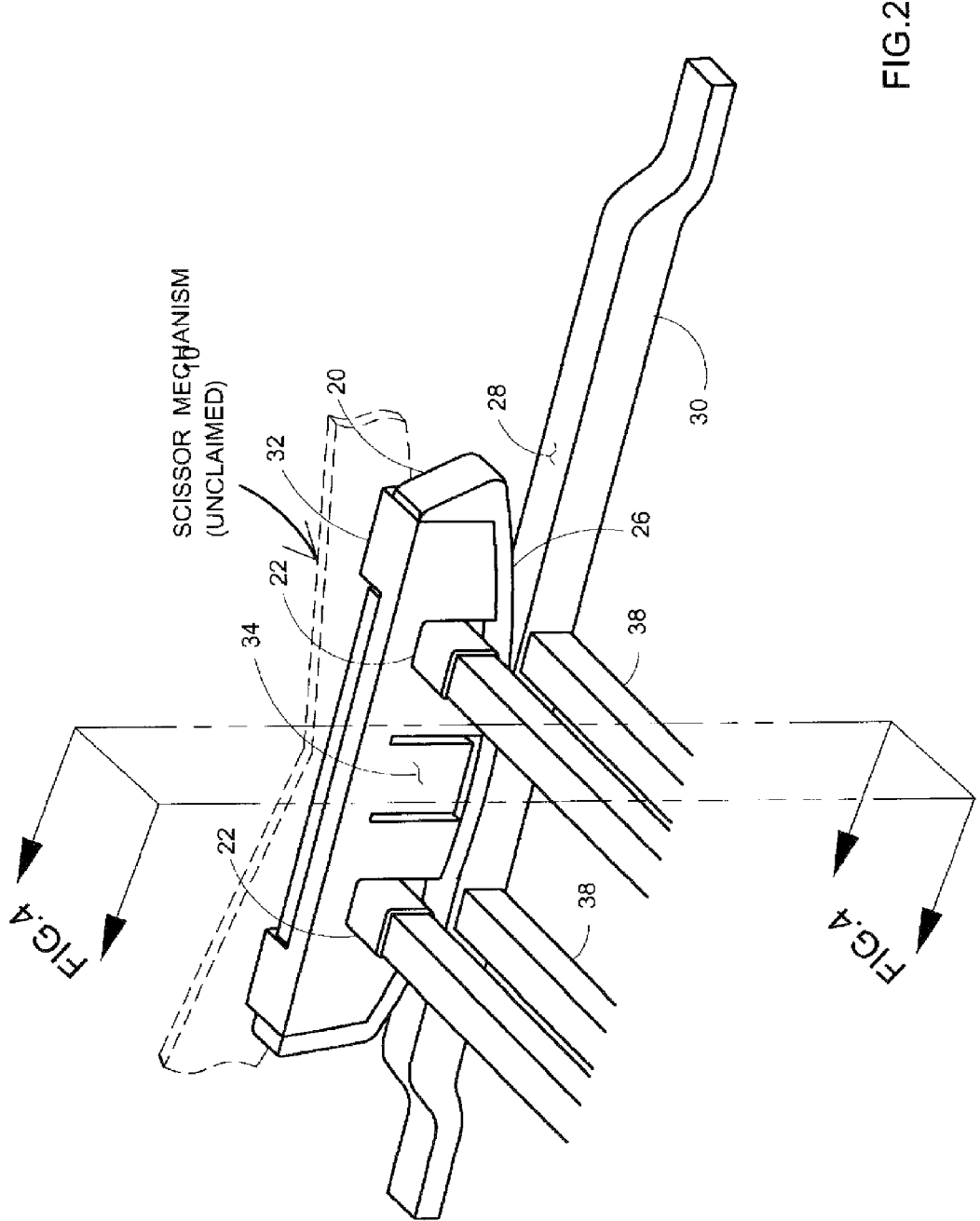

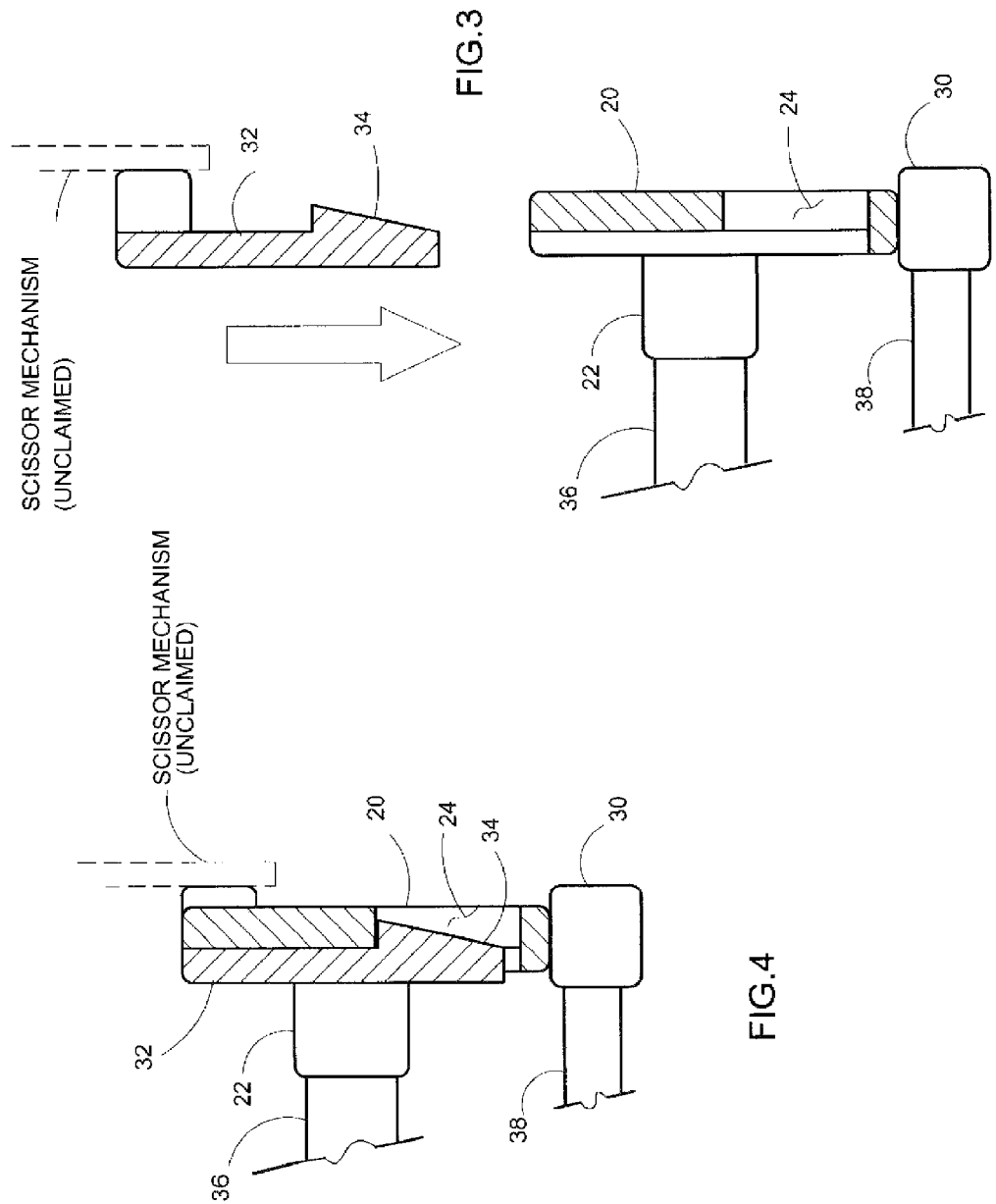

… (1)

CAM ASSEMBLY UTILIZING 2 OR MORE INTERCONNECTED AND LOCKING PARTS FOR FURNITURE

INDEX TO RELATED APPLICATIONS

This application is a non-provisional of, and claims benefit to U.S. Provisional Patent Application Ser. No. 61/758,231 filed Jan. 29, 2013 the disclosure of which is incorporated herein by reference in its entirety.

BACKGROUND OF THE INVENTION

Field of the Invention

Ready to assemble furniture is very popular because they can be relatively inexpensive as compared to fully assembled furniture and for ease of assembly. However, there are pieces of furniture that have been proven to be exceedingly difficult to provide as ready to assemble furniture.

Reclining furniture with rocker, glider, swivel and other mechanisms create particular problems when used in ready to assemble furniture. In fact the precision of preparing the interlocking parts is typically beyond the ability of the average person working with ready to assemble furniture. The present invention addresses this deficiency and provides a novel interlocking cam assembly whereby the interlocking cams are provided to allow for easier assembly of reclining and motion furniture. The multi-piece cam further provides a configuration that is more easily disassembled and serviced in the field.

SUMMARY OF THE INVENTION

In one embodiment, the present invention is a mechanism for assembling and connecting a furniture base to a piece of furniture comprising:
 a furniture base having a first cam, configured with a first cam interlock, associated therewith;
 a furniture frame having a second cam, configured with a second cam interlock, associated therewith;
 each of said first cam and second cam interlocks configured to mate and interlock one to another.

In one embodiment, the first cam is a system including two or more cam units.

In one embodiment, the second cam is a system including two or more cam units.

In one embodiment, the first cam has two or more first cam interlocks.

In one embodiment, the second cam has two or more second cam interlocks.

The mechanism is configured to be used with a multitude of furniture bases including, but not limited to recliner mechanism bases, rockers, gliders, swivels, swivel rockers, swivel gliders, twin sleepers, full sleepers, queen sleepers, king sleepers, or combinations thereof.

In one embodiment, the first cam interlock is integrated onto said first cam.

In one embodiment, the second cam interlock is integrated onto said second cam.

In one embodiment, the first cam interlock and said first cam are constructed of a unitary piece.

In one embodiment, the second cam interlock and said second cam are constructed of a unitary piece.

In one embodiment, the first cam interlock and said second cam interlock connect in a snap-fit locking arrangement.

The present invention further contemplates a method of connecting a furniture base to furniture, said method comprising the steps of:
 providing a first cam and second cam according to any of the configurations or combinations disclosed herein;
 associating said first cam with a furniture base;
 connecting said second cam to either a furniture seat box or a reclining mechanism;
 positioning said first and second cams to align respective interlocks;
 interlocking each of said first and second cams one to another.

BRIEF DESCRIPTION OF THE SEVERAL VIEWS OF THE DRAWING

FIG. 1A is a side perspective view of a two-piece cam assembly configuration in separated position.

FIG. 1B is a side perspective view of a two-piece cam assembly configuration in separated position.

FIG. 1C is a side perspective view of a four-piece cam assembly configuration in separated position.

FIG. 2 is a side perspective view of a two-piece cam assembly configuration in a connected position.

FIG. 3 is a partial cross-section from FIGS. 1A and 1B with directional arrow indicating direction of connection of separate cam components.

FIG. 4 is a partial cross-section from FIGS. 1A, 1B, and 3 with separate cam components in a connected position.

DETAILED DESCRIPTION OF THE PREFERRED EMBODIMENT

The present invention relates to a multi-piece cam assembly for furniture. The figures are demonstrative and the invention contemplates multiple configurations including, but not limited to two, three, four, and five cam component systems.

In one embodiment, the two-piece cam is suitable for assembling a furniture base to the seat box portion of furniture. It is further contemplated that the present invention is suitable for connection of reclining mechanisms to a base in ready to assemble furniture. Reclining furniture is without limitation and includes, but is not limited to, a rocker, glider, swivel, swivel rocker, swivel glider, power variations of all of the above, sleepers, or any piece of furniture that utilizes reclining mechanism. However, the multi-piece cam assembly is suitable for all furniture where connection is desired.

In one embodiment, the two-piece cam is particularly well suited for connecting a furniture frame to a base. Although the drawings demonstrate a first cam as a locking cam connected to a furniture frame and a second or receiving cam connected to a base, the locking/receiving configurations are interchangeable.

First cam, configured as a receiving cam 20 is constructed and arranged with a locking orifice 24. Orifice 24 is constructed and arranged to interact with locking tab 34 on locking cam 32.

Receiving cam 20 has formed thereon a horizontal support receiver 22 which is constructed and arranged to receive horizontal supports 36 of the present invention. In one embodiment, as seen in FIG. 1A, receiving cam 20 is constructed arranged with a curved lower surface 26 that interacts with the upper surface 28 of furniture base 30. In another embodiment, as seen in FIG. 1B, cam 20 is flat and secured to base 30.

As generally understood, ready to assemble furniture is constructed such that an ordinarily skilled consumer can assemble the furniture. Reclining mechanisms are typically exceedingly complex and furthermore locking mechanisms are often excluded from ready to assemble furniture products.

The locking cam 32 of the present invention is constructed and arranged to affix to the seat box or scissor/main assembly of a reclining mechanism of a piece of furniture. In one embodiment, locking cam 32 is affixed to the seat box. In another embodiment, the seat box frame or recliner frame is formed with a cam portion integral therewith.

Once locking cam 32 is affixed to the underside of an article of furniture it is positioned above receiving cam 20 whereby locking tab 34 interacts with locking tab 24 in order to removably interconnect locking cam 32 with receiving cam 20.

In the embodiment of FIG. 1C, receiving cams 20 are provided in pairs.

In use, cam 20 is positioned over a prepared upper surface 28 of furniture base 30. When locking cam 32 is positioned and locked onto receiving cam 20 the article of furniture attached thereto will be able to rock along base 30. Base 30 is constructed and arranged to have two main base portions each being 30 that are interconnected by transverse supports 38. Cam 20 has receiving socket 42 configured to mate with positioning tab 40 of cam 32.

Although a particular embodiment is demonstrated, the multi-piece cam is contemplated to connect and disconnect in a male-female interlock arrangement. The two-piece cam represents a significant and unforeseen improvement in furniture design and construction by providing a construction element that improves ease of assembly and disassembly.

The multi-piece cam assembly is suitable not only for rocking, reclining, and gliding assemblies, but for all furniture in which there is the attachment of a mechanism to a frame base.

In one embodiment the invention is a mechanism for a piece of furniture comprising:

two or more locking cams, constructed and arranged with at least one locking mechanism on each cam; two or more receiving cams, said receiving cams are constructed and arranged to receive said locking mechanism, said interconnected cams are configured to be used in reclining furniture and sleepers to include, but not limited to, rockers, gliders, swivels, swivel rockers, swivel gliders, twin sleepers, full sleepers, queen sleepers, king sleepers. In addition, this mechanism assembly covers power reclining variations.

The multi cam configurations provide additional benefit relating to simplification of the assembly process.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A mechanism for assembling and connecting a furniture base with a top surface to a furniture box with at least one scissor, glider or recliner mechanism affixed thereto comprising:
    a first cam piece with a top and a bottom, said bottom seated on the top surface of said base, said first cam piece configured with a first cam interlock and a first positioning element;
    a second cam piece with a top and a bottom, securely affixed in a fixed position to a lowermost section of said at least one scissor, glider or recliner mechanism, said second cam piece configured with a second cam interlock and a second positioning element;
    wherein when said first cam piece is moved toward said second cam piece in a connection direction, with said first and second positioning elements aligned to engage each other, said first cam interlock and said second cam interlock are aligned to mate and resiliently interlock one to another, with some or all of the top of the second cam piece extending over some or all of the top of the first cam piece.

2. The mechanism of claim 1, wherein said first cam piece comprises two or more first cam elements.

3. The mechanism of claim 1, wherein said second cam piece comprises two or more second cam elements.

4. The mechanism of claim 1, wherein said first cam piece comprises two or more first cam interlocks.

5. The mechanism of claim 4, wherein said second cam piece comprises two or more second cam interlocks corresponding to said two or more first cam interlocks.

6. The mechanism of claim 5, wherein said two or more first and second cam interlocks comprise a locking orifice adapted to receive and engage a locking tab, and wherein the bottom of the second cam piece rests on a portion of the first cam piece below the top of the first cam piece.

7. The mechanism of claim 1, wherein said base is selected from a group consisting of a recliner base, a rocker base, a glider base, a swivel base, a swivel rocker base, a swivel glider base, a twin sleeper base, a full sleeper base, a queen sleeper base, and a king sleeper base.

8. The mechanism of claim 1, wherein said first cam piece comprises one or more support receivers, and said second cam piece comprises one or more corresponding slots adapted to fit over said one or more support receivers when the first cam piece and the second cam piece are interlocked.

9. The mechanism of claim 1, wherein said first cam interlock and said first cam piece are constructed of a unitary piece.

10. The mechanism of claim 1, wherein said second cam interlock and said second cam piece are constructed of a unitary piece.

11. The mechanism of claim 1, wherein first cam interlock and said second cam interlock connect in a snap-fit locking arrangement.

12. The connecting assembly of claim 1, wherein said first and second cam pieces are disengageable.

13. A method of connecting a furniture base with a top surface to a furniture box with at least one scissor, glider or recliner mechanism affixed thereto, said method comprising the steps of:
    providing a first cam piece and a second cam piece according to claim 1;
    seating said first cam piece on the top of said furniture base;
    securely affixing said second cam piece in a fixed position to a lowermost section of said at least one scissor, glider or recliner mechanism;
    positioning said first and second cam pieces to align the respective cam interlocks and said first and second positioning elements along a connection direction; and
    interlocking each of said first and second cam pieces one to another by engaging the first and second cam interlocks to each other, and engaging the first and second positioning elements to each other.

* * * * *